(12) United States Patent
Franklin et al.

(10) Patent No.: US 12,481,368 B2
(45) Date of Patent: *Nov. 25, 2025

(54) GESTURE-BASED USER INTERFACE

(71) Applicant: Capital One Services, LLC, McLean, VA (US)

(72) Inventors: David Franklin, Turnersville, NJ (US); Van Shea Sedita, Wilmington, DE (US); Stephen Simpson, Pittsburgh, PA (US)

(73) Assignee: Capital One Services, LLC, McLean, VA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/589,927

(22) Filed: Feb. 1, 2022

(65) Prior Publication Data

US 2022/0261083 A1 Aug. 18, 2022

Related U.S. Application Data

(63) Continuation of application No. 15/644,008, filed on Jul. 7, 2017, now Pat. No. 11,275,446.

(60) Provisional application No. 62/359,386, filed on Jul. 7, 2016.

(51) Int. Cl.
| | | |
|---|---|---|
| *G06F 3/01* | (2006.01) | |
| *G06F 3/038* | (2013.01) | |
| *G06F 3/0487* | (2013.01) | |
| *G06F 9/451* | (2018.01) | |

(52) U.S. Cl.
CPC .............. *G06F 3/017* (2013.01); *G06F 3/038* (2013.01); *G06F 3/0487* (2013.01); *G06F 9/453* (2018.02)

(58) Field of Classification Search
CPC ........ G06F 3/017; G06F 3/038; G06F 3/0487; G06F 9/453; G06F 21/32; G06F 3/0482; G06F 3/04883; G06F 3/0304; G10L 17/22; H04N 21/42204; B60K 35/10; B60K 2360/146; G06Q 40/00; G08C 2201/32

See application file for complete search history.

(56) References Cited

U.S. PATENT DOCUMENTS

| | | |
|---|---|---|
| 8,196,066 B1 | 6/2012 | Ouyang et al. |
| 8,700,392 B1 | 4/2014 | Hart et al. |
| 9,218,813 B2 | 12/2015 | Baldwin et al. |
| 9,299,350 B1 | 3/2016 | Dumont et al. |
| 9,600,074 B2 * | 3/2017 | Arnold ..................... G09B 5/00 |
| 10,178,301 B1 | 1/2019 | Welbourne et al. |
| 2002/0015064 A1 | 2/2002 | Robotham et al. |
| 2003/0218643 A1 | 11/2003 | Sakata et al. |
| 2005/0134800 A1 | 6/2005 | Kim |

(Continued)

*Primary Examiner* — Irete F Ehichioya
*Assistant Examiner* — Phoebe X Pan
(74) *Attorney, Agent, or Firm* — Foley & Lardner LLP

(57) ABSTRACT

A computer-implemented method for enabling gesture-based interactions between a computer program and a user is disclosed. According to certain embodiments, the method may include initiating the computer program. The method may also include detecting that a condition has occurred. The method may also include activating a gesture-based operation mode of the computer program. The method may also include receiving gesture data generated by a sensor, the gesture data representing a gesture performed by the user. The method may further include performing a task based on the gesture data.

18 Claims, 7 Drawing Sheets

(56) References Cited

U.S. PATENT DOCUMENTS

| | | | |
|---|---|---|---|
| 2005/0212751 A1* | 9/2005 | Marvit | G06F 1/1694 345/156 |
| 2007/0177804 A1 | 8/2007 | Elias et al. | |
| 2008/0148030 A1 | 6/2008 | Goffin | |
| 2008/0170776 A1 | 7/2008 | Albertson et al. | |
| 2008/0178126 A1 | 7/2008 | Beeck et al. | |
| 2010/0162182 A1* | 6/2010 | Oh | G06F 3/0488 715/863 |
| 2010/0281432 A1 | 11/2010 | Geisner et al. | |
| 2011/0126154 A1 | 5/2011 | Boehler et al. | |
| 2011/0221666 A1* | 9/2011 | Newton | G06F 3/0304 345/156 |
| 2011/0257971 A1 | 10/2011 | Morrison | |
| 2012/0249741 A1 | 10/2012 | Maciocci et al. | |
| 2012/0281885 A1 | 11/2012 | Syrdal et al. | |
| 2013/0050118 A1 | 2/2013 | Kjelsbak et al. | |
| 2013/0155237 A1 | 6/2013 | Paek et al. | |
| 2013/0159939 A1 | 6/2013 | Krishnamurthi | |
| 2013/0198762 A1 | 8/2013 | Thorpe et al. | |
| 2013/0246264 A1* | 9/2013 | Lucas | G06Q 40/02 705/42 |
| 2014/0040831 A1* | 2/2014 | Akasaka | G08C 17/02 715/841 |
| 2014/0062861 A1* | 3/2014 | Yamashita | G06F 3/011 382/103 |
| 2014/0071041 A1* | 3/2014 | Fujimaki | G06F 3/017 345/156 |
| 2014/0143688 A1 | 5/2014 | Hou et al. | |
| 2014/0160030 A1 | 6/2014 | Wright et al. | |
| 2014/0214672 A1* | 7/2014 | Luo | G07F 19/207 705/44 |
| 2014/0379341 A1* | 12/2014 | Seo | G06F 1/163 704/246 |
| 2015/0154394 A1* | 6/2015 | Kapinos | G06F 21/31 726/19 |
| 2015/0193023 A1* | 7/2015 | Odgers | G06F 3/0483 345/163 |
| 2015/0205359 A1 | 7/2015 | Feng et al. | |
| 2015/0206535 A1 | 7/2015 | Iwai | |
| 2015/0212677 A1 | 7/2015 | Dunne et al. | |
| 2015/0213244 A1* | 7/2015 | Lymberopoulos | G06V 40/70 726/19 |
| 2015/0287043 A1 | 10/2015 | Michaelis et al. | |
| 2016/0011665 A1* | 1/2016 | Arnold | G06F 3/038 345/156 |
| 2016/0062473 A1 | 3/2016 | Bouchat et al. | |
| 2016/0182502 A1 | 6/2016 | Smith et al. | |
| 2016/0187992 A1 | 6/2016 | Yamamoto et al. | |
| 2017/0087453 A1 | 3/2017 | Poisner et al. | |
| 2017/0205888 A1 | 7/2017 | Nicholson et al. | |
| 2017/0212597 A1 | 7/2017 | Mishra | |
| 2017/0315706 A1 | 11/2017 | Helppi et al. | |
| 2018/0121215 A1 | 5/2018 | Charbonneau et al. | |
| 2018/0329501 A1* | 11/2018 | Marchenko | G06F 3/038 |
| 2019/0324527 A1* | 10/2019 | Presant | G06F 16/24578 |
| 2020/0310549 A1* | 10/2020 | Rani | G06V 40/20 |
| 2024/0112597 A1* | 4/2024 | Kim | G09B 21/004 |

* cited by examiner

GESTURE-BASED USER INTERFACE

RELATED APPLICATIONS

This application is a continuation application of U.S. application Ser. No. 15/644,008, filed on Jul. 7, 2017, which claims priority to U.S. Provisional Patent Application No. 62/359,386, filed on Jul. 7, 2016, and entitled "Gesture-Based User Interface," the disclosures of which are hereby incorporated by reference in their entireties.

BACKGROUND

Advancements in computer technology have brought tremendous convenience to people's life and greatly improved our society's productivity. For example, a financial service provider (e.g., a bank) may develop various applications, through which a customer can remotely access and management her financial accounts.

Applications need user interfaces (UIs) to interact with a user. Traditional UIs are achieved by way of, for example, key combinations, mouse motions, mouse clicks, and displays. However, they often require hand-eye coordination of a user. They may also require multiple user actions to finish a task. Thus, these traditional UIs are unintuitive, slow, and rigid. For example, when the above bank customer discovers that suspicious activates have occurred to her account, she needs to first find and open the "emergency contact" page in the banking application. She may then face a pop-up window listing several reasons for contacting the bank. She needs to select the most applicable reason and then click a "confirm" button to send an emergency notice to the bank. Sometimes, she may also be required to type a message describing her situation. This way of interacting with the application is cumbersome.

Moreover, physically impaired people may not be able to effectively use a conventional UI. For example, a visually impaired person cannot view information displayed on a screen, and cannot use a mouse or keyboard as intended. For another example, patients suffering from hand or finger arthritis often find it difficult, painful, or even impossible to perform the clicking action on a mouse button or typing action on a keyboard.

In addition, more and more people are using mobile devices (e.g., a smart phone and a smart wristband) to perform various tasks. The size constraints associated with mobile devices renders many input devices associated with conventional computing systems, such as keyboards, mouse, etc., to be impractical.

Therefore, there is a high demand for faster, more robust, and more intuitive mechanisms for enable the interaction between computing devices and their users. In view of the shortcomings and problems with traditional workload management systems, an improved system and method for server workload management is desired.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The present disclosure provides methods and systems for providing a natural UI between a user and a computer program, i.e., an application or an operating system. In particular, the natural interactions may be in the form of gestures. Additional aspects of the disclosed embodiments are set forth below in this disclosure.

Consistent with the present embodiments, a computer-implemented method for enabling gesture-based interactions between a computer program and a user is disclosed. For example, the method may include initiating the computer program. The method may also include detecting that a condition has occurred. The method may also include activating a gesture-based operation mode of the computer program. The method may also include receiving gesture data generated by a sensor, the gesture data representing a gesture performed by the user. The method may further include performing a task based on the gesture data.

Consistent with the present embodiments, a non-transitory computer readable medium is disclosed. The medium stores instructions, which when executed, cause at least one processor to perform a method for enabling gesture-based interactions between a computer program and a user. For example, the method may include initiating the computer program. The method may also include detecting that a condition has occurred. The method may also include activating a gesture-based operation mode of the computer program. The method may also include receiving gesture data generated by a sensor, the gesture data representing a gesture performed by the user. The method may further include performing a task based on the gesture data.

Consistent with the present embodiments, a terminal is disclosed. For example, the terminal may include a memory storing instructions that are part of a computer program. The terminal may also include a processor configured to execute the instructions to: initiate the computer program; detect that a condition has occurred; activate a gesture-based operation mode of the computer program; receive gesture data generated by a sensor, the gesture data representing a gesture performed by the user; and perform a task based on the gesture data.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to the disclosed embodiments, examples of which are illustrated in the accompanying drawings. Wherever convenient, the same reference numbers will be used throughout the drawings to refer to the same or like parts.

The disclosed embodiments include methods and systems configured to, for example, provide a natural language-based UI between a user and a computer program, i.e., an application or an operating system. In particular, the natural language may be in the form of gestures. In some embodiments, the computer program may have two operation modes, i.e., a standard operation mode and a gesture-based operation mode. When the gesture-based operation mode is activated, the computer program may activate the features of receiving and executing gesture commands, and convert the existing UI into a gesture-focused UI, through which all or majority of the functions of the computer program may be controlled by gesture commands. This way, previously complicated user operations may be simplified as gestures, so as to allow fast, natural, and intuitive usage of the computer program. In some embodiments, the accessibility of the gesture-focused UI may be further enhanced by incorporate assistive technologies like voice/sound recognition, such that physically disabled users may interact with the computer problem through voices/sounds, in addition to gestures.

Figure 1:
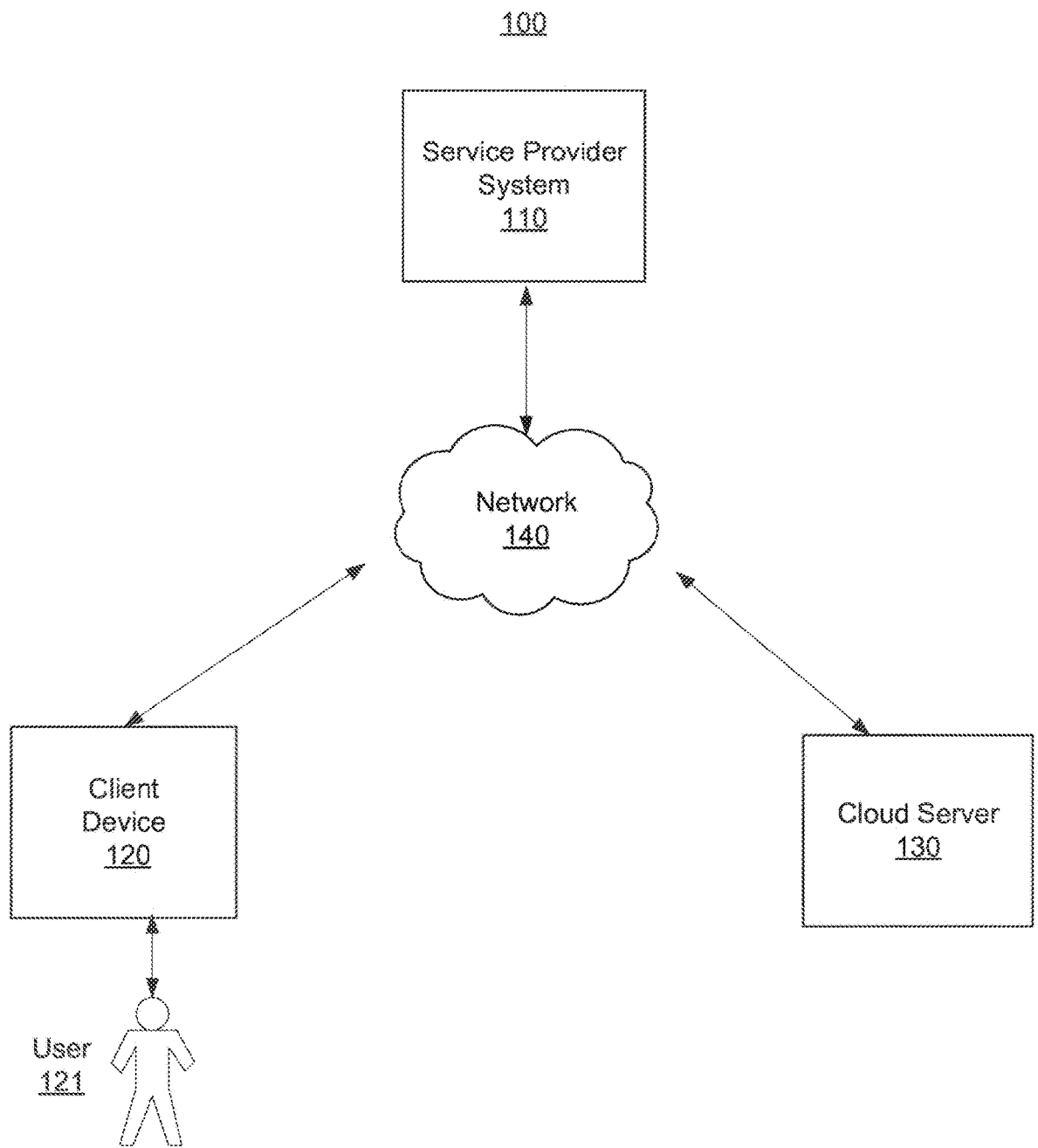
FIG. 1 is a block diagram of an exemplary system, consistent with disclosed embodiments.

FIG. 1 is a block diagram of an exemplary system 100 for performing one or more operations consistent with the disclosed embodiments. Referring to FIG. 1, system 100 may include one or more service provider systems 110, one or more client devices 120, one or more users 121, one or more cloud servers 130, and a network 140. Components of system 100 may be configured to receive and execute gesture commands, according to the disclosed embodiments.

In some embodiments, the disclosed methods are used to enable user 121 to use gestures to control client device 120. Client device 120 may be a desktop computer, a laptop, a server, a mobile device (for example, tablet, smart phone, etc.), a smart TV, a wearable device (for example, multifunctional watch, smart wristband, pair of multifunctional glasses), or any suitable device with computing capability and/or gesture sensing capability. In some embodiments, client device 120 may be a computing device that is not operated by user 121, but is part of a system, such as a home entertainment system, a building security system, an automated teller machine (ATM). These systems, for example, may be associated with a third-party.

In some embodiments client device 120 may include a gesture sensing device for capturing real-time gesture data of a person (e.g., user 121). The gesture data may represent the movements performed by user 121. A gesture sensing device may be incorporated into client device 120 or otherwise in communication with client device 120.

Client device 120 may also include executable software instructions for performing certain aspects of the disclosed methods. In some embodiments, client device 120 includes executable software instructions provided as part of an application or app associated with a service provider, such as, for example, a financial service provider for performing operations associated with one or more financial service accounts. In some embodiments, the disclosed methods may be performed in association with the financial service application. Client device 120 is discussed in additional detail with respect to FIG. 2, below.

As further described herein, the disclosed methods may be used to enable client device 120 to interact with user 121 based on gestures, voices, or any other types of input performed by user 121. In some embodiments, some or all steps of the disclosed methods may be implemented by service provider system 110. Service provider system 110 may be associated with any service providing entity, including a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing or otherwise offering financial services, service provider system 110 may be enabled by the disclosed methods to remotely interact with a person associated with a financial service account, through gesture commands.

The disclosed embodiments are not limited to a financial service provider. Rather, disclosed systems and methods may be implemented by any entity with a need or purpose to interact with people, regardless of industry. For ease of discussion, in some embodiments, some or all steps of the disclosed methods may be described as implemented by cloud server 130, which may be independent of or associated with one or more service provider systems 110, one or more merchant systems (not shown), or a plurality of other entity systems (not shown) associated with system 100. In some embodiments, cloud server 130 may be associated with a third-party service entity that provides services such as analyzing data regarding the behaviors and/or habits of people in using the financial service applications.

Service provider system 110, client device 120, and cloud server 130 may include one or more computing devices (e.g., computer(s), server(s), etc.), memory storing data and/or software instructions (e.g., database(s), memory devices, etc.), and other known computing components configured to perform the disclosed methods. In some embodiments, the one or more computing devices may include one or more processors configured to execute software instructions stored on one or more memory devices to perform one or more methods or other operations consistent with the disclosed embodiments. In certain aspects, users may operate one or more components of system 100 to receive communications, initiate operations, and/or provide input for one or more operations consistent with the disclosed embodiments. The disclosed embodiments are not limited to any particular configuration of system 100.

Service provider system 110, client device 120, and cloud server 130 may be configured to communicate with each other and one or more other components of system 100 over a network 140 for performing the disclosed methods. Network 140 may comprise any type of computer networking arrangement configured to provide communications or exchange data, or both, between components of system 100.

For example, network 140 may include any type of network (including infrastructure) that provides communications, exchanges information, and/or facilitates the exchange of information, such as the Internet, a private data network, a virtual private network using a public network, a Wi-Fi network, a LAN or WAN network, and/or other suitable connections that may enable information exchange among various components of system 100. Network 140 may also include a public switched telephone network ("PSTN") and/or a wireless cellular network. Network 140 may be a secured network or unsecured network. In some embodiments, one or more components of system 100 may communicate directly through a dedicated communication link(s).

It is to be understood that the configuration of the functional building blocks of system 100 have been defined herein for the convenience of the description. The components and arrangement of the components included in system 100 may vary. For example, in some embodiments, service provider system 110 and cloud server 130 may be implemented together as part of a single system. Additionally, in some embodiments, system 100 may include other components that perform or assist in the performance of one or more processes consistent with the disclosed methods. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
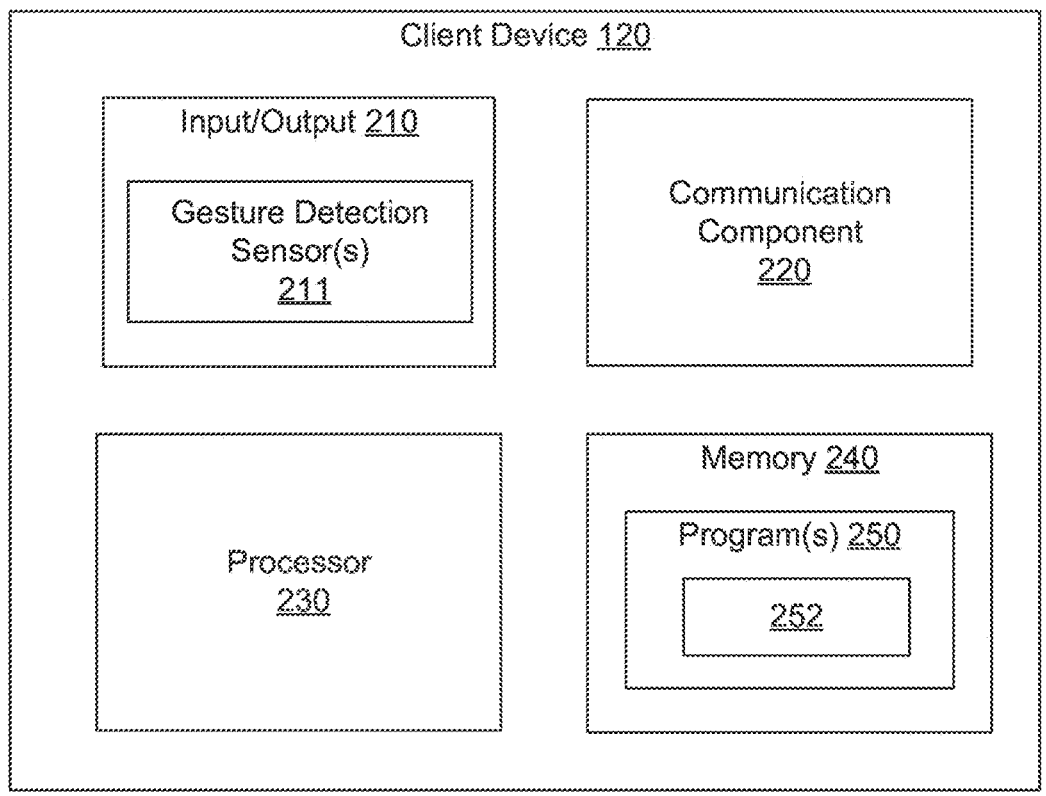
FIG. 2 is a block diagram of an exemplary client device, consistent with disclosed embodiments.

FIG. 2 shows an exemplary configuration of client device 120, consistent with disclosed embodiments. Client device 120 may run a computer program to receive and execute gesture commands from user 121. These gesture commands may operate client device 120 to perform remote or mobile transactions with service provider system 110. In some embodiments, client device 120 may be a personal computing device. For example, client device 120 may be a smartphone, a laptop or notebook computer, a tablet, a wearable device, or any mobile device with computing ability, or any combination of these computers and/or affiliated components. In some embodiments, client device 120 may be a device that has computing capabilities and is operated by user 121. For example, client device 120 may be a smart TV, a dashboard in a vehicle, etc. Client device 120 may include any arrangement of one or more computing devices configured to perform one or more operations consistent with disclosed embodiments.

Client device 120 may include one or more processors configured to execute software instructions stored in memory, such as memory 240 included in client device 120. Client device 120 may include software that when executed by a processor (e.g., processor 230) performs known Internet-related communication, content display processes, and financial service-related processes for user 121. For instance, client device 120 may execute browser or related mobile display software that generates and displays interfaces including content on a display device included in, or in communication with, client device 120. Client device 120 may be a mobile device that executes mobile device applications and/or mobile device communication software that allows client device 120 to communicate with service provider system 110 or could server 130 and other components over network 140, and generates and displays content in interfaces via a display device included in client device 120. The disclosed embodiments are not limited to any particular configuration of client device 120.

Client device 120 may be configured with storage that stores one or more operating systems that perform known operating system functions when executed by one or more processors. By way of example, the operating systems may include Microsoft Windows™, Unix™, Linux™, Android™, OS X™, or other types of operating systems. Accordingly, embodiments of the disclosed invention may operate and function with computer systems running any type of operating system. Client device 120 may also include communication software that, when executed by a processor, provides communications with network 140, such as Web browser software, tablet or smart handheld device networking software, etc.

Client device 120 may include an input/output (I/O) interface 210 configured to allow client device 120 to send and receive information from user 121 or another device. For example, I/O interface 210 may include various input/output devices, such as a keyboard, a mouse-type device, a physical button, a click wheel, oratory input, etc.

In particular, I/O interface 210 may include various gesture detection sensors 211 configured to sense gestures performed by user 121. For example, gesture detection sensors 211 may include an image capturing device, such as a CMOS or CCD image sensor, configured to capture images of gestures performed by user 121.

Gesture detection sensors 211 may also include a proximity sensor configured to detect proximity of a body part from the computing device. As an example, user 121 may use hands for making one or more gestures. The proximity sensor may thus detect proximity of the hand.

Gesture detection sensors 211 may also include a radar configured to detect number of body parts and angular movement of the body parts required to make one or more gestures. As an example, user 121 may use hands for making the one or more gestures. In this scenario, the radar detects number of fingers used and angular movement of the hand while making the one or more gestures.

Gesture detection sensors 211 may also include an infrared (IR) muscle contraction sensor configured to detect number of muscles involved while making the one or more gestures.

Gesture detection sensors 211 may also include any other devices suitable for detecting gestures performed by user 121, such as an accelerometer, a gyroscope, a pressure sensor, or the like.

It is contemplated that client device 120 may also receive gesture data from gesture detection sensors that are in communication with client device 120 but are separate from or otherwise not integrated in client device 120. It is also contemplated that other type of input devices may also be converted into gesture sensing devices. For example, a mouse or a remote control, when installed with a motion sensor, can also sense the gestures performed by user 121.

I/O Interface 210 may also include a screen providing an input/output interface between the client device 120 and user 121. In some embodiments, the screen may include a liquid crystal display (LCD) and a touch panel (TP). If the screen includes the touch panel, the screen may be realized as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

I/O interface 210 may also include devices configured to output and/or input audio signals. For example, I/O interface 210 may include a microphone configured to receive an external audio signal when client device 120 is in an operation mode, such as a call mode, a recording mode, and a voice recognition mode. The received audio signal may be stored in memory 210. In some embodiments, I/O interface 210 may further include a speaker to output audio signals Client device 120 may include a communication component 220 configured to facilitate communication, wired or wirelessly, between client device 120 and other devices. Client device 120 may access a wireless network based on one or more communication standard, such as Wi-Fi, LTE, 2G, 3G, 4G, 5G, etc. In one exemplary embodiment, communication component 220 may receive a broadcast signal or receive associated information from an external broadcast management system via a broadcast channel. In one exemplary embodiment, communication component 220 may further include a NFC module to facilitate short-range communications. In other embodiments, communication component 220 may be implemented based on a radio frequency identification (RFID) technology, an infrared data association (IrDA) technology, an ultra-wideband (UWB) technology, a Bluetooth technology, a short-range wireless technology, or other technologies.

Client device 120 may include at least one processor 230, which may be one or more known computing processors, such as one or more application-specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. Processor 230 may execute various instructions stored in client device 120 to perform various functions of the disclosed embodiments described in greater detail below.

Client device 120 may include a memory 240, which may be a volatile or non-volatile, magnetic, semiconductor, tape, optical, removable, non-removable, or other type of storage device or tangible (i.e., non-transitory) computer-readable medium. Memory 240 may store one or more programs 250. Programs 250 may include operating systems (not shown) that perform known operating system functions when executed by one or more processors. Disclosed embodiments may operate and function with computer systems running any type of operating system. Client device 120 may be a device that executes mobile applications for performing operations consistent with disclosed embodiments, such as a tablet or mobile device.

In some embodiments, client device 120 may have a financial service application 252 installed thereon, which may enable client device 120 to communicate with service provider system 110, which may be associated with a financial entity, via network 140 and perform aspects of the disclosed methods for enabling gesture-based interactions between client device 120 and user 121. For example, financial service application 252 may have a gesture-based operation mode. When this mode is enabled, financial service application 252 may constantly monitor the gestures performed by user 121 and execute commands corresponding to the gestures.

Figure 3A:
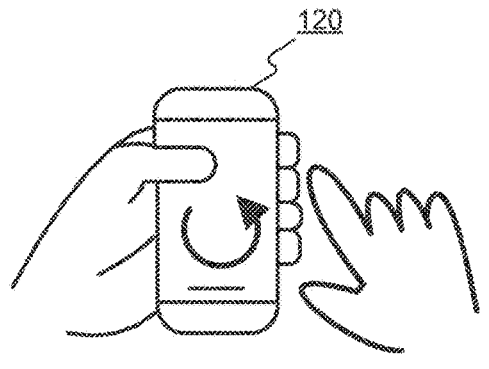
FIG. 3A is a schematic diagram illustrating an exemplary gesture-based user interfaces, consistent with the disclosed embodiments.

FIGS. 3A-3D illustrate four exemplary implementations of gesture-based user interface, consistent with the disclosed embodiments. Referring to FIG. 3A, client device 120 may include a touch screen or touch pad. User 121 may move her fingers or hands directly on the surface of the touch screen to issue a gesture command.

Figure 3B:
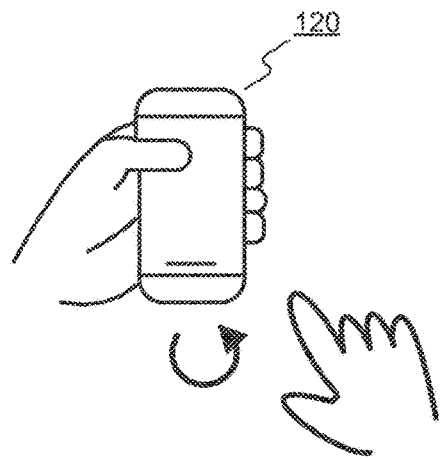
FIG. 3B is a schematic diagram illustrating an exemplary gesture-based user interfaces, consistent with the disclosed embodiments.

Referring to FIG. 3B, client device 120 may include an air-gesture capturing system (e.g., a camera system) for capturing user 120's movement in the open air. For example, user 121 may be a visually impaired person who cannot use the touch screen of client device 120 as intended. Instead, user 121 may move her fingers, hands, and/or arms in the open air near client device 120 to issue gesture commands. Additionally, client device 120 may have an audio system (not pictured in FIG. 3B) configured to generate voice feedback about the execution results of the gesture commands and/or capture and recognize voice commands issued by user 121. The gesture and voice commands allow a visually impaired person to quickly interact with client device 120.

Figure 3C:
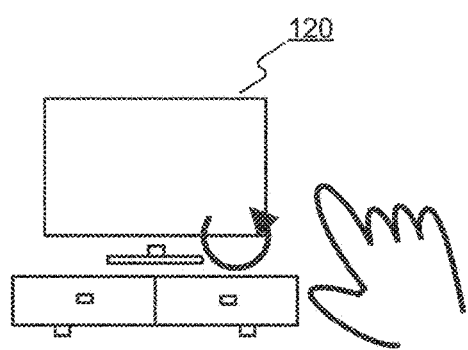
FIG. 3C is a schematic diagram illustrating an exemplary gesture-based user interfaces, consistent with the disclosed embodiments.

Referring to FIG. 3C, client device 130 may be a smart TV. The smart TV may be part of a home entertainment system that can sense and recognize gestures performed by user 121. For example, the smart TV may have a touch screen, on which user 121 may perform various gestures. For another example, there may be provided a touch pad separate from but in communication with the smart TV. User 121 may perform gestures on the touch pad, which in turn transmit information about the gestures to the smart TV. Also for example, the smart TV may be paired with a remote control with motion sensing capabilities. User 121 may move the remote control in the air, so as to generate gesture commands. For yet another example, similar to the description of FIG. 3B, the smart TV may also include an air-gesture capturing system, such that user 121 may openly gesture in the air to issue commands.

Figure 3D:
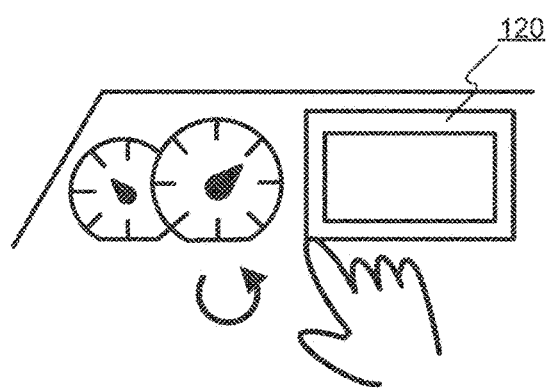
FIG. 3D is a schematic diagram illustrating an exemplary gesture-based user interfaces, consistent with the disclosed embodiments.

Referring to FIG. 3D, client device 120 may be a control panel on a dashboard of a vehicle. The control panel may have a touch surface through which user 121 may issue gesture commands. Alternatively, user 121 may openly gesture in the air towards the control panel to issue commands. In these ways, user 121 may interact with the control panel quickly without being overly distracted from driving the vehicle.

The following processes are directed to various embodiments for enabling gesture-based interactions between client device 120 and user 121. The following processes may be performed by various aspects and components of system 100 as is apparent from the disclosure.

Figure 4:
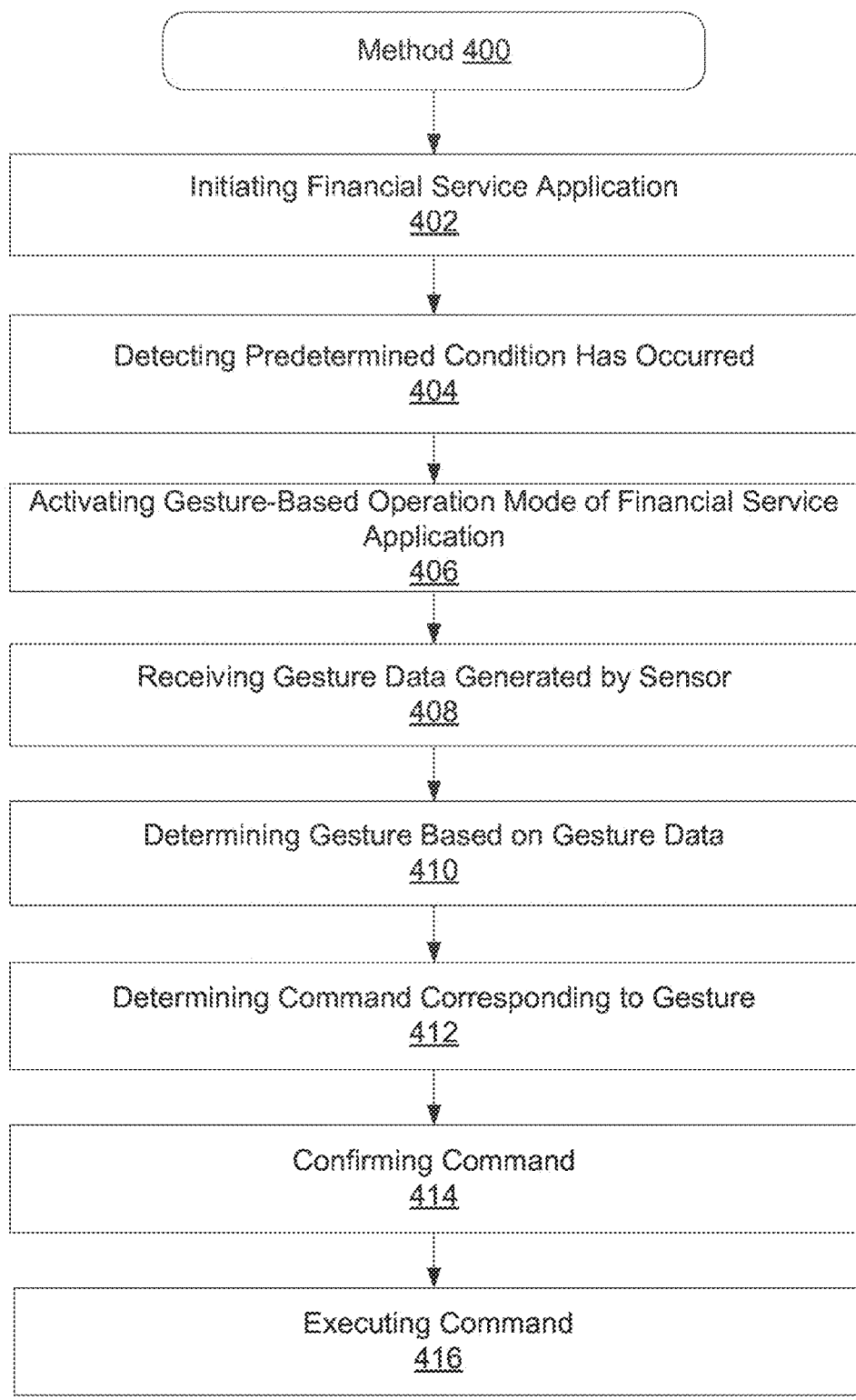
FIG. 4 is a flowchart of an exemplary method for receiving and executing gesture commands, consistent with disclosed embodiments.

FIG. 4 is a flowchart of a method 400 for receiving and executing gesture-based commands, consistent with disclosed embodiments. For example, method 400 may be performed by client device 120, which is installed with financial service application 252.

In step 402, client device 120 may initiate financial service application 252. For example, client device 120 may display an icon associated with financial service application 252 on a screen of client device 120. When user 121 clicks the icon, client device 120 may activate financial service application 252. Alternatively, financial service application 252 may be initiated by user 121 though audio command. When client device 120 detects a sound pattern corresponding to financial service application 252, client device 120 may initiate financial service application 252. Other embodiments for initiating financial service application 252 are possible as well.

Financial service application 252 may have two operation modes, a standard operation mode and a gesture-based operation mode. In the standard operation mode, financial service application 252 may present a normal user interface. For example, financial service application 252 makes client device 120 to display webpages and/or interface windows in a display screen. User 121 may use a mouse to navigate on the webpages and/or windows, and switch among them. User 121 may also perform standard touch operations, such as clicking, on a touch screen of client device 120.

By contrast, in the gesture-based operation mode, financial service application 252 may activate and establish communication with gesture detection sensors 211. Financial service application 252 may also convert other existing input and output devices of client device 120 into portals to receive gesture commands. For example, financial service application 252 may convert the entire screen of client device 120 into a touch screen or touch pad and lock the screen in such touch mode, so that user 121 may conveniently use the entire screen area to issue gesture commands and avoid distractions from other unrelated UI features, for example, pop-up keyboards.

In the gesture-based operation mode, financial service application 252 may completely or mainly operate based on gesture commands. Financial service application 252 may execute all possible commands and functions based on gestures performed by user 121. This is advantageous because, for example, a visually impaired user can rely on gestures to directly and quickly communicate with financial service application 252.

In step 404, client device 120 may detect that a predetermined condition has occurred. The predetermined condition may be in various forms. In some embodiments, financial service application 252 may display a button in its user interface window. When user 121 clicks the button, financial service application 252 may enter the gesture-based operation.

In some embodiments, financial service application 252 may automatically switch to the gesture-based operation mode when an emergency is detected. For example, when user 121 discovers that her financial accounts are compromised, she may click a hot key in financial service application 252 to switch to the gesture-based operation mode. As described below in more details, gesture commands may be faster than other types of input methods, and thus entering the gesture-based operation mode may allow user 121 to react to the emergency more quickly.

In some embodiments, financial service application 252 may determine whether to enter the gesture-based mode based on identity of user 121. For example, a visually impaired user may rely on the gesture-based mode to use the functions of financial service application 252. When financial service application 252 determines that the current user is a predetermined disabled user, financial service application 252 may automatically switch to the gesture-based mode. In some embodiments, the identity of a person may be determined based on facial recognition techniques to identify distinct facial features of a person's face captured in image data. Other image processing techniques may be used to identify a user's fingerprint, or a pattern of a person's iris, or other biometric information identifiable in the image data. Other biometric information may include uniquely identifying information associated with a user such as a "signature" pattern of facial changes or contortions associated with speech, or a "signature" of hand movements associated with performing certain gestures. For example, a person may be identified based on the unique combination or "signature" of facial changes when speaking certain letters, words, or sounds. People may also be identified based on the unique hand or finger positioning patterns when making certain gestures. The disclosed embodiments may generally determine the identity of a person based on any suitable biometric information that may be captured in image data with a prescribed authentication parameter.

In step 406, client device 120 may activate the gesture-based operation mode. The gesture-based operation mode creates an extra interaction "layer," either in addition to or in replacement of the existing user interface, for receiving gesture commands from user 121 and present gesture-related information to user 121. Within this extra layer, user 121 may use gestures to enter all or some of the commands provided by financial service application 252. In some embodiments, the gesture-based operation mode may also use other assistive technologies to assist user 121 in using the gesture commands. For example, the gesture-based operation may use audio cue to inform user 121 about the execution result of the gesture commands or to prompt user 121 to enter certain gesture commands. In one embodiment, the gesture-based operation mode may enable financial service application 252 to receive, recognize, and execute audio commands from user 121.

In step 408, client device 120 may receive gesture data representing a gesture performed by user 121. For example, the gesture data may include a single image or a video clip. The signal image may show a static hand or finger gesture. The video clip may show a motion of the hand or finger. Sometimes, the gesture data may include both a still image and a video clip to show relationship between a static gesture and a related motion.

In step 410, client device 120 may determine the gesture based on the gesture data. For example, client device 120 may use any suitable computer-vision algorithm to extract features from the gesture data and decipher the gesture represented by the gesture data. Then, in step 412, client device 120 may query a database to determine a command corresponding to the gesture. The database may store a mapping relationship between the commands used in financial service application 252 and the corresponding gestures.

Further, in step 414, client device 120 may confirm whether the command is intended by the user. Client device 120 may employ various confirmation mechanisms. In one embodiment, client device 120 may generate a prompt requesting the user to confirm the command. The prompt may be in various formats, such as a visual or verbal cue. Client device 120 may require the user to actively confirm that the identified command is correct. Exemplary ways of making the active confirmations may include pressing a button, performing a gesture, speaking a phrase, or a combination thereof. For example, client device 120 may require the user to perform a confirmation gesture, such as thumbs-up for "yes" and thumbs-down for "no." Alternatively, client device 120 may indicate that the identified command will be executed unless the user indicates, within a predetermined time period (e.g., five seconds), that the command is incorrect. Once the command is confirmed, client device 120 may proceed to execute the command (step 416).

Method 400 can create a gesture-focused UI aided with assistive technologies like audio recognition. Such gesture-focused UI makes the previous complex interfaces easier to use. As an illustration of the implementation of method 400, after financial service application 252 is opened, a visually impaired user 121 may slide her finger through a fingerprint scanner on client device 120 or read out a predetermined phrase. After financial service application 252 recognizes the fingerprint or voice of user 121, financial service application 252 may enter the gesture-based operation mode. Then user 121 may draw a circle in the air to instruct financial service application 252 to check her account balance. Upon receiving the gesture command, financial service application 252 may generate an audio message presenting the current balance and the account activities within the last week. If user 121 determines that a faux or fraudulent transaction has occurred, user 121 may perform an "S" shaped air-gesture to instruct financial service application 252 to disable the account and transmit a duress signal to service provider system 110. This way, user 121 can use one or two gestures to complete a transaction in financial service application 252. The experience of using financial service application 252 can become simpler and faster.

Figure 5:
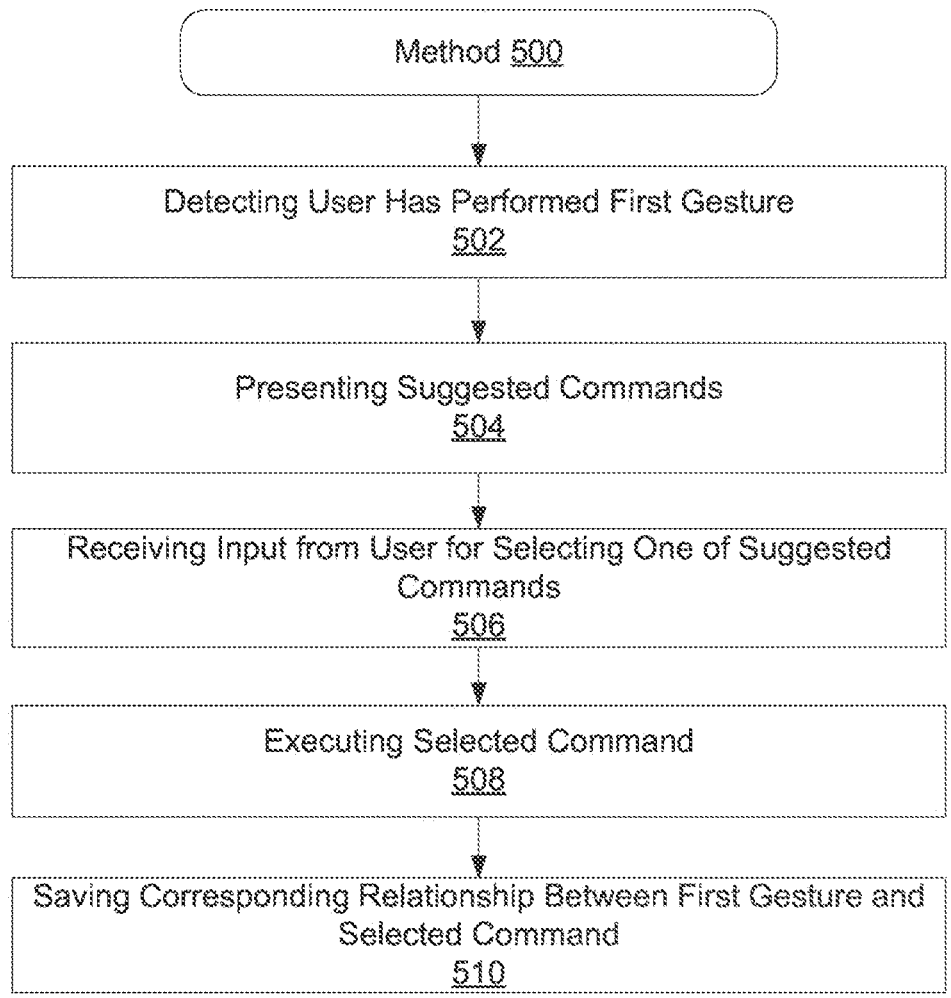
FIG. 5 is a flowchart of an exemplary method for enabling gesture-based interactions between a client device and a user, consistent with disclosed embodiments.

The gesture-focused UI can enable financial service application 252 to be used entirely based on gestures. FIG. 5 is a flowchart of a method 500 for enabling gesture-based interactions between client device 120 and user 121, according to some exemplary embodiments.

In step 502, client device 120 may detect user 121 has performed a first gesture. As described above (steps 412-416), if client device 120 determines that the first gesture corresponds to a command, client device 120 may proceed to execute the corresponding command. Otherwise, client device 120 may present on a screen a listed of suggested commands (step 504). For example, user 121 may have swiped left or right in the open air. If client device 120 cannot identify the command corresponding to such gesture, client device 120 may present (e.g., display or read out) a list of suggested commands. The suggested commands may include, for example, switching between the checking and savings accounts, opening the most recent statement, displaying the account balance, etc. When client device 120 receives an input from user 121 for selecting one of the suggested commands (step 506), client device 120 may proceed to execute the selected command (step 508). For example, if the selected command is to switch between the accounts, client device 120 may display the account summary page of a different account. In some embodiments, client device 120 may also save in memory 240 a corresponding relationship between the first gesture and the selected command (step 510), such that client device 120 may directly execute the selected command when detecting the first gesture again in the future. Method 500 makes it possible for client device 120 to be controlled entirely based on gesture commands. Moreover, method 500 makes the gesture-focused UI adaptive and fast to use.

In some embodiments, client device 120 may determine the list of suggested commands based on data regarding user 121's previous behaviors in using financial service application 252. For example, client device 120 may use machine-learning algorithm to extract and analyze the historical patterns of user 121's usage of financial service application 252. If, for example, the analysis shows that the feature most frequently used by user 121 is displaying the account balance, client device 120 may include displaying the account balance in the suggested commands.

In some embodiments, client device 120 may determine the list of suggested commands based on data regarding multiple users' behaviors in using financial service application 252. For example, cloud server 130 may collect and aggregate the usage data from multiple users of financial service application 252. Cloud server may then determine the multiple users' collective usage trend. Cloud server 130 may discovered that majority of users switch between different accounts by swiping to the right. Cloud server 130 may then send the analysis result to client device 120. This way, when client device 120 detects that user 121 has performed a left swiping, client device 120 may include the account switching as a suggested command.

Figure 6:
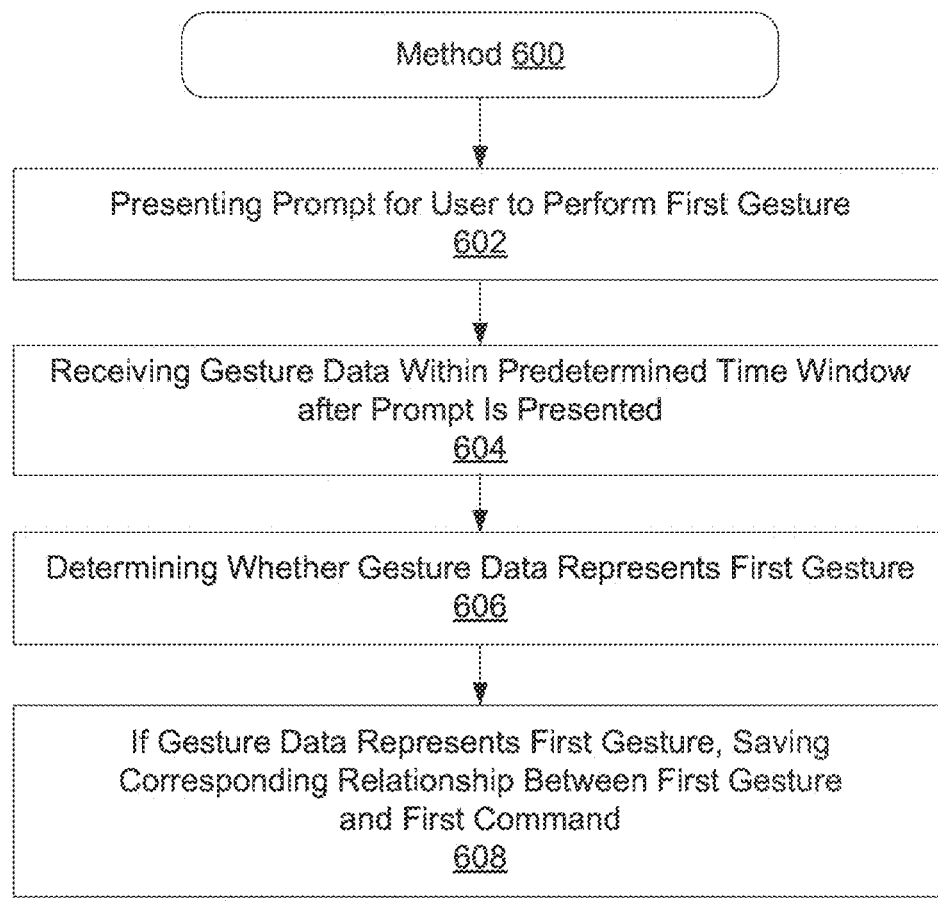
FIG. 6 is a flowchart of an exemplary method for setting gesture commands, consistent with disclosed embodiments.

In some embodiments, client device 120 may allow user 121 to customize the gesture commands. FIG. 6 is a flowchart of method of 600 for setting gesture commands, according to certain exemplary embodiments.

In step 602, client device 121 may present a prompt for user 121 to perform a first gesture. The prompt may be a message window displayed on a screen of client device 121. The prompt may include the instructions for performing a first gesture and ask user 121 whether to set a corresponding relationship between the first gesture and a first command.

If client device 120 receives gesture data (i.e., detects the performance of a gesture) within a predetermined time window after the prompt is presented (step 604), client device 120 may determine whether the gesture data represents the first gesture (step 606). In step 608, if the gesture data represents the first gesture, client device 120 may determine that user 121 intends to set a corresponding relationship between the first gesture and the first command, and save the corresponding relationship.

Figure 7:
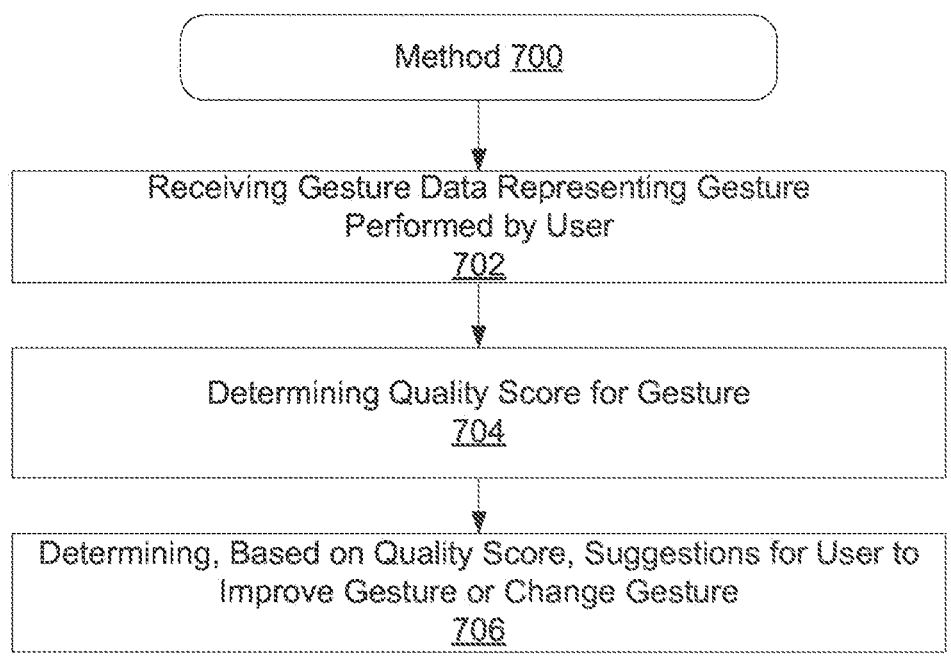
FIG. 7 is a flowchart of an exemplary method for providing gesture-related suggestions to a user, consistent with disclosed embodiments.

Sometimes, client device 120 may determine the gesture data does not unambiguously represent a gesture. The present disclosure also provides methods to guide user 121 to improve the accuracy of performing the gestures. FIG. 7 is a flowchart of a method 700 for providing gesture-related suggestions to user 121, according to certain exemplary embodiments.

Method 700 starts with client device 120 receiving gesture data representing a gesture performed by user 121 (step 702). In step 704, client device determines a quality score for the gesture. The quality scores may be a sum of multiple scores that measure various features of the gesture. For example, the quality score may be a sum of noise score and shape score of the gesture. Client device 120 may assign a noise score based on the mistakes made by user 121 while making the gesture or each time the gesture was not detected correctly by client device 120. Client device 120 may assign a shape score based on the shape of user 121's hands during the performance of the gesture.

In step 706, client device 120 may determine, based on the quality score, suggestions for user 121 to either improve the gesture or change the gesture. For example, if the quality score is below a predetermined threshold, client device 120 may determine that the gesture cannot be accurately determined. Client device 120 may then present suggestions, through a visual or audio message, for user 121 to improve performance of the gesture, such as swiping less distance in certain directions. In one embodiment, client device 120 may also suggest user 121 to change the currently used gesture, such as changing a complicated gesture to a simpler gesture or a gesture that user 121 performs well.

In some embodiments, similar to method 500, when the gesture performed by user 121 cannot be ascertained, client device 120 may also present (e.g., display or read out) a list of suggested gestures, and ask user 121 to confirm which suggested gesture is the intended gesture. After user 121 selects a suggested gesture, client device 120 may determine the command corresponding to the selected gesture and execute the command.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, Python, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (for example, of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for enabling gesture-based interactions between a computer program and a user, the system comprising:
one or more processors; and
one or more non-transitory, computer-readable media storing instructions that, when executed by the one or more processors, cause operations comprising:
determining an identity of the user based on a user-identifying extremity-based gesture movement received during a first gesture-based operation mode, wherein the identity of the user is determined based on a match between the user-identifying extremity-based gesture movement and a stored extremity-based gesture movement signature of the user;
in response to determining the identity of the user is a disabled user based on the stored extremity-based gesture movement signature associated with the disabled user, activating a second gesture-based operation mode by activating one or more gesture detection sensors;
in response to receiving gesture data from the one or more activated gesture detection sensors in connection with the activation of the second gesture-based operation mode, generating one or more suggested commands for presentation to the user via a user interface; and
executing a first command of the one or more suggested commands in response to a user selection of the first command via the user interface.

2. A method comprising:
determining an identity of a user based on a user-identifying extremity-based gesture movement received during a first gesture-based operation mode, wherein the identity of the user is determined based on a match between the user-identifying extremity-based gesture movement and a stored extremity-based gesture movement signature of the user;
in response to determining the identity of the user is a disabled user based on the stored extremity-based gesture movement signature associated with the disabled user, activating a second gesture-based operation mode by activating one or more gesture detection sensors;
receiving gesture data from the user;
in response to receiving the gesture data from the one or more activated gesture detection sensors in connection with the activation of the second gesture-based operation mode, generating one or more suggested commands for presentation to the user via a user interface; and
executing a first command of the one or more suggested commands in response to a user selection of the first command via the user interface.

3. The method of claim 2, further comprising receiving an input from the user, wherein the second gesture-based operation mode is activated based on the received input.

4. The method of claim 2, wherein generating the one or more suggested commands comprises:
determining an inability to identify a command corresponding to the gesture data; and
based on determining the inability, generating the one or more suggested commands.

5. The method of claim 2, wherein generating the one or more suggested commands comprises determining the one or more suggested commands based on data regarding behaviors of the user.

6. The method of claim 2, wherein generating the one or more suggested commands comprises:
receiving, from a server, data regarding behaviors of multiple users; and
determining an additional suggested command based on the data.

7. The method of claim 2, wherein executing the first command comprises saving a relationship between the gesture data and the first command.

8. The method of claim 2, wherein receiving the gesture data comprises:
presenting, through the user interface, a prompt for the user to perform a gesture; and
receiving the gesture data within a predetermined amount of time after the prompt is presented.

9. The method of claim 2, wherein executing the first command comprises:
determining a quality score based on the gesture data; and
generating, based on the quality score, suggestions for the user to improve performance of a gesture associated with the gesture data.

10. The method of claim 2, comprising:
determining whether the gesture data represents a gesture; and
based on determining that the gesture data represents the gesture, saving a relationship between the gesture and a predetermined command.

11. One or more non-transitory, computer-readable media storing instructions that, when executed by one or more processors, cause operations comprising:
determining an identity of a user based on a user-identifying extremity-based gesture movement received during a first gesture-based operation mode, wherein the identity of the user is determined based on a match between the user-identifying extremity-based gesture movement and a stored extremity-based gesture movement signature of the user;
in response to determining the identity of the user is a disabled user based on the stored extremity-based gesture movement signature associated with the disabled user, activating a second gesture-based operation mode by activating one or more gesture detection sensors;
in response to receiving gesture data from the one or more activated gesture detection sensors in connection with the activation of the second gesture-based operation mode, generating one or more suggested commands for presentation to the user via a user interface; and executing a first command of the one or more suggested commands in response to a user selection of the first command via the user interface.

12. The one or more non-transitory, computer-readable media of claim 11, wherein the instructions cause operations further comprising receiving an input from the user, wherein the second gesture-based operation mode is activated based on the received input.

13. The one or more non-transitory, computer-readable media of claim 11, wherein the instructions for generating the one or more suggested commands cause operations comprising:
  determining an inability to identify a command corresponding to the gesture data; and
  based on determining the inability, generating the one or more suggested commands.

14. The one or more non-transitory, computer-readable media of claim 11, wherein the instructions for generating the one or more suggested commands cause operations comprising determining the one or more suggested commands based on data regarding behaviors of the user.

15. The one or more non-transitory, computer-readable media of claim 11, wherein the instructions for generating the one or more suggested commands cause operations comprising:
  receiving, from a server, data regarding behaviors of multiple users; and
  determining an additional suggested command based on the data.

16. The one or more non-transitory, computer-readable media of claim 11, wherein the instructions for executing the first command cause operations comprising saving a relationship between the gesture data and the first command.

17. The one or more non-transitory, computer-readable media of claim 11, wherein the instructions for receiving the gesture data cause operations comprising:
  presenting, through the user interface, a prompt for the user to perform a gesture; and
  receiving the gesture data within a predetermined amount of time after the prompt is presented.

18. The one or more non-transitory, computer-readable media of claim 11, wherein the instructions for executing the first command cause operations comprising:
  determining a quality score based on the gesture data; and
  generating, based on the quality score, suggestions for the user to improve performance of a gesture associated with the gesture data.

* * * * *